(12) United States Patent
LeMeur, Jr. et al.

(10) Patent No.: US 6,425,161 B1
(45) Date of Patent: Jul. 30, 2002

(54) INDUSTRIAL CASTER WHEEL WITH ELASTOMERIC SPRING/DAMPER MEMBER

(75) Inventors: Henri E. LeMeur, Jr., Warren; John D. Swartz, Tidioute, both of PA (US)

(73) Assignee: Superior Tire & Rubber Corporation, Warren, PA (US)

( * ) Notice: Subject to any disclaimer, the term of this patent is extended or adjusted under 35 U.S.C. 154(b) by 16 days.

(21) Appl. No.: 09/592,917

(22) Filed: Jun. 13, 2000

(51) Int. Cl.$^7$ .................................... A47B 91/00
(52) U.S. Cl. ..................... 16/44; 16/45; 16/DIG. 36
(58) Field of Search ................... 16/44, 45, 35 D, 16/18 R, DIG. 36, 29; 267/102, 140.11, 195, 141

(56) References Cited

U.S. PATENT DOCUMENTS

| | | | |
|---|---|---|---|
| 1,745,992 A | * | 2/1930 | Herold |
| 2,707,795 A | * | 5/1955 | Skupas |
| 2,738,542 A | * | 3/1956 | Clark |
| 4,346,498 A | | 8/1982 | Welsch et al. |
| 4,462,138 A | | 7/1984 | Black |
| 4,485,521 A | * | 12/1984 | Welsch et al. |
| 4,559,669 A | | 12/1985 | Bonzer et al. |
| 4,763,910 A | * | 8/1988 | Brandli et al. |
| 5,347,680 A | * | 9/1994 | Rippe |
| 5,400,469 A | | 3/1995 | Simonsen |
| 5,403,031 A | * | 4/1995 | Gottschalk et al. |
| 5,448,796 A | | 9/1995 | Larson |
| 6,149,169 A | * | 11/2000 | Chelgren |
| 6,279,199 B1 | * | 8/2001 | Plate |

FOREIGN PATENT DOCUMENTS

DE    3525443 A  * 7/1985

* cited by examiner

Primary Examiner—Anthony Knight
Assistant Examiner—Mark Williams
(74) Attorney, Agent, or Firm—Oliff & Berridge, PLC (57) ABSTRACT

An industrial caster wheel assembly comprises a base member, a wheel, side plates, a housing, a pivot axle, and a suspension assembly. The suspension assembly includes an adjustable axle, a support member, and a plate. The support member allows one of the wheel and the base member to rotate about the pivot axle as the adjustable axle compresses the support member by contacting the plate.

19 Claims, 6 Drawing Sheets

INDUSTRIAL CASTER WHEEL WITH ELASTOMERIC SPRING/DAMPER MEMBER

BACKGROUND OF THE INVENTION

1. Field of Invention

The invention relates to industrial caster wheels.

2. Description of Related Art

Industrial caster wheels are used, for example, as stabilizer casters on a pallet truck. Such pallet trucks have a single drive wheel and one industrial caster wheel on each side. Usually, the industrial caster wheel has a spring member that absorbs shocks while traveling. The spring member also provides stability as the object to which the industrial caster wheel is attached travels over rough surfaces.

SUMMARY OF THE INVENTION

Conventional industrial caster wheels use mechanical springs. The spring member is limited in travel due to bottoming out, which occurs due to poor shock absorbing characteristics. Previous efforts to replace mechanical springs with elastomeric members has generally been unsuccessful. These previous industrial caster wheels have used torsional elastomeric elements. However, these torsional-elastomeric-member-type industrial caster wheels have experienced significant performance degradation as the torsional elastomeric member abrades with usage. This abrasion occurs due to sliding contact with a housing for the torsional elastomeric member.

This invention provides an industrial caster wheel assembly that has an improved life span.

This invention separately provides an industrial caster wheel that has an improved spring response.

This invention separately provides an industrial caster wheel that has an elastomeric member that acts as both a spring and a damper.

This invention separately provides an industrial caster wheel that requires fewer parts to provide the spring response.

In various exemplary embodiments of the industrial caster wheel according to this invention, an industrial caster wheel assembly includes a base member and a housing that supports the base member. The base member has an upper surface and a lower surface. The industrial caster wheel also include a wheel that has an adjustable wheel axle that supports the wheel about a first axis. The industrial caster wheel has a number of side plates. Each of the side plates has an inside wall facing the wheel. At least some of the side plates engage the wheel axle.

A pivot axle is supported by at least some of the side plates and extends through the housing and those side plates. The pivot axle rotates about a second axis. The industrial caster wheel has a suspension assembly. The suspension assembly has an adjustable axle that extends through the housing and at least some of the side plates and an elastomeric support member and a plate. The elastomeric support member resists pivot movements of the side plates that tend to push the pivot axle toward the base member.

In some exemplary embodiments, the adjustable axle compresses the elastomeric support member by contacting the plate at approximately the midpoint of a first dimension of the elastomeric support member.

These and other features and advantages of this invention are described in or are apparent from the following detailed description of the preferred embodiments.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
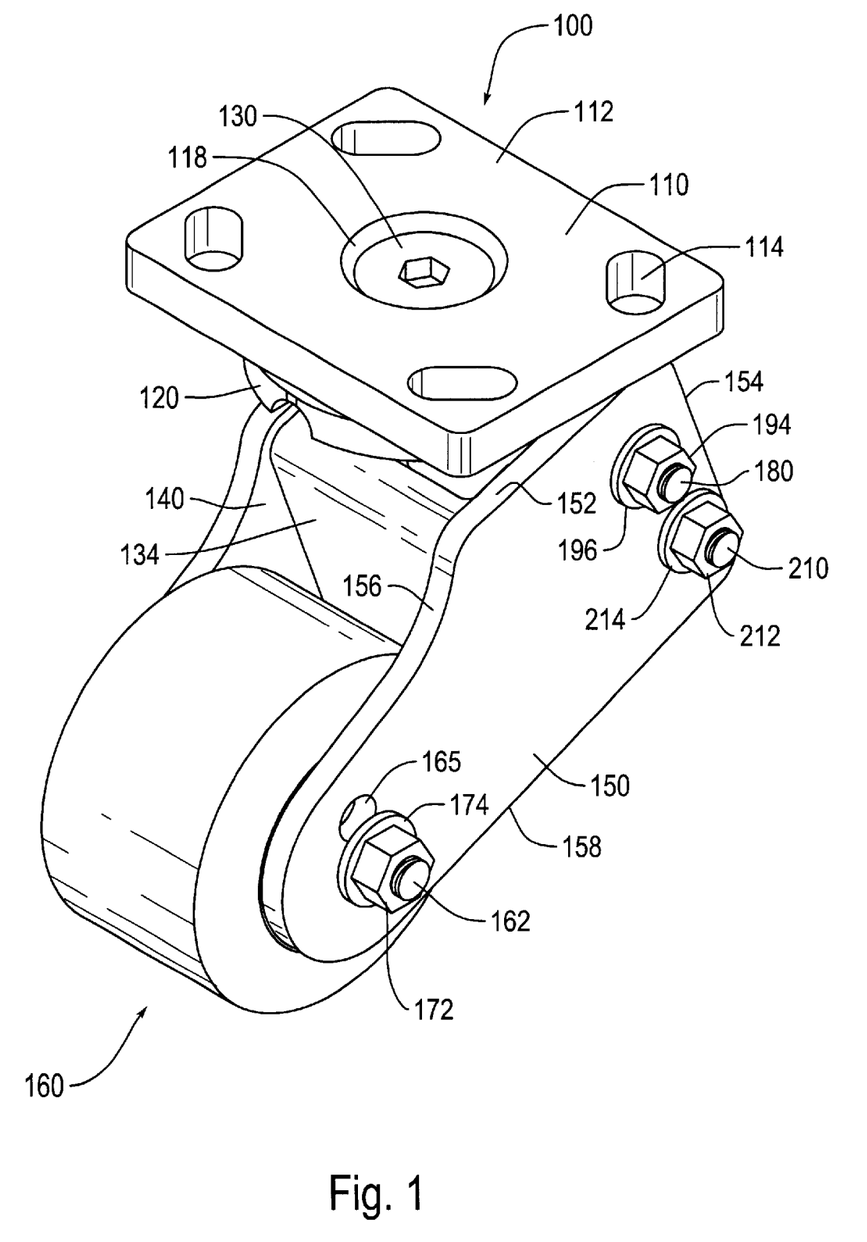
FIG. 1 is an isometric view of a first exemplary embodiment of a sprung caster wheel assembly according to this invention.
Figure 2:
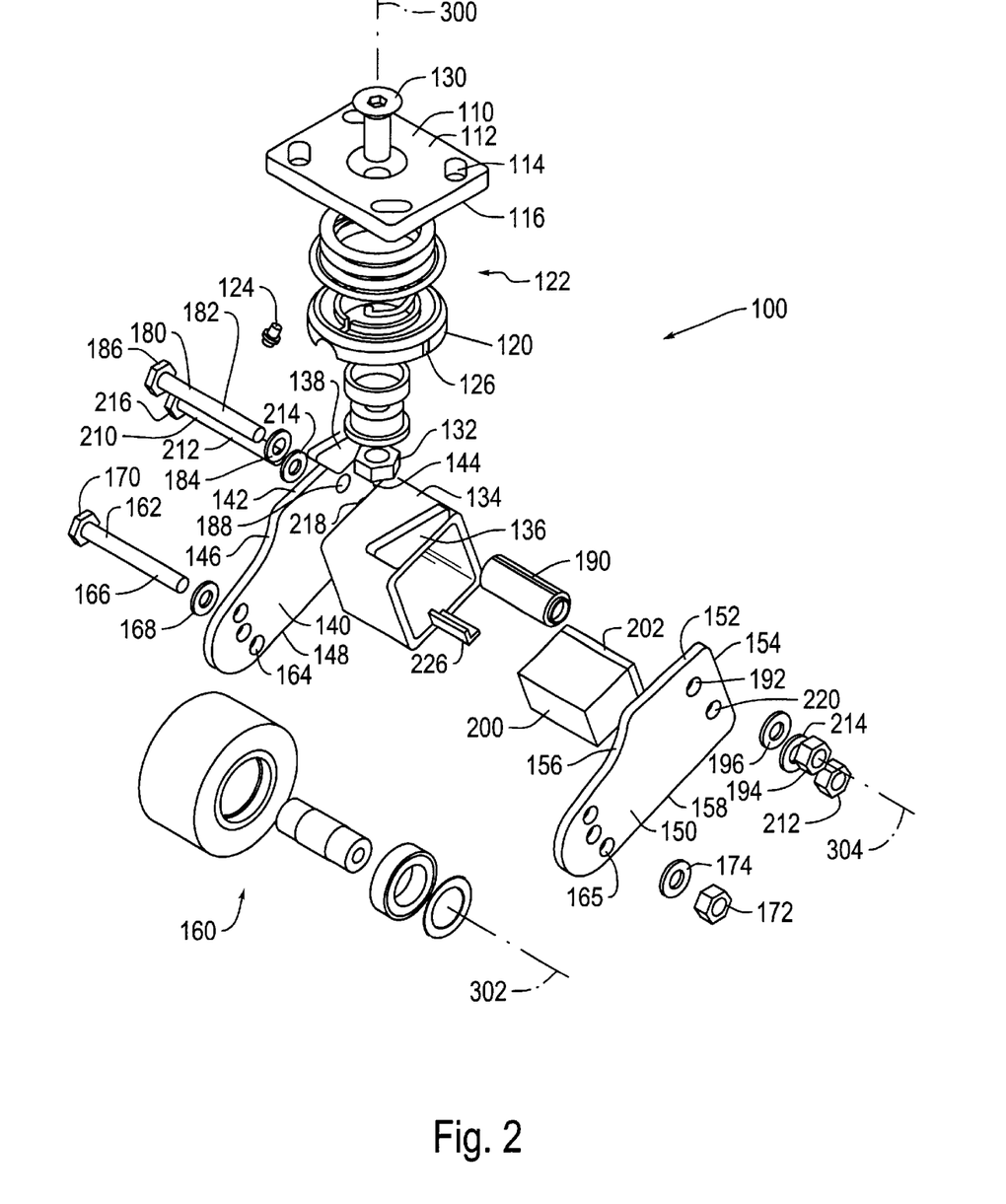
FIG. 2 is an exploded view of the caster wheel assembly of FIG. 1.
Figure 3:
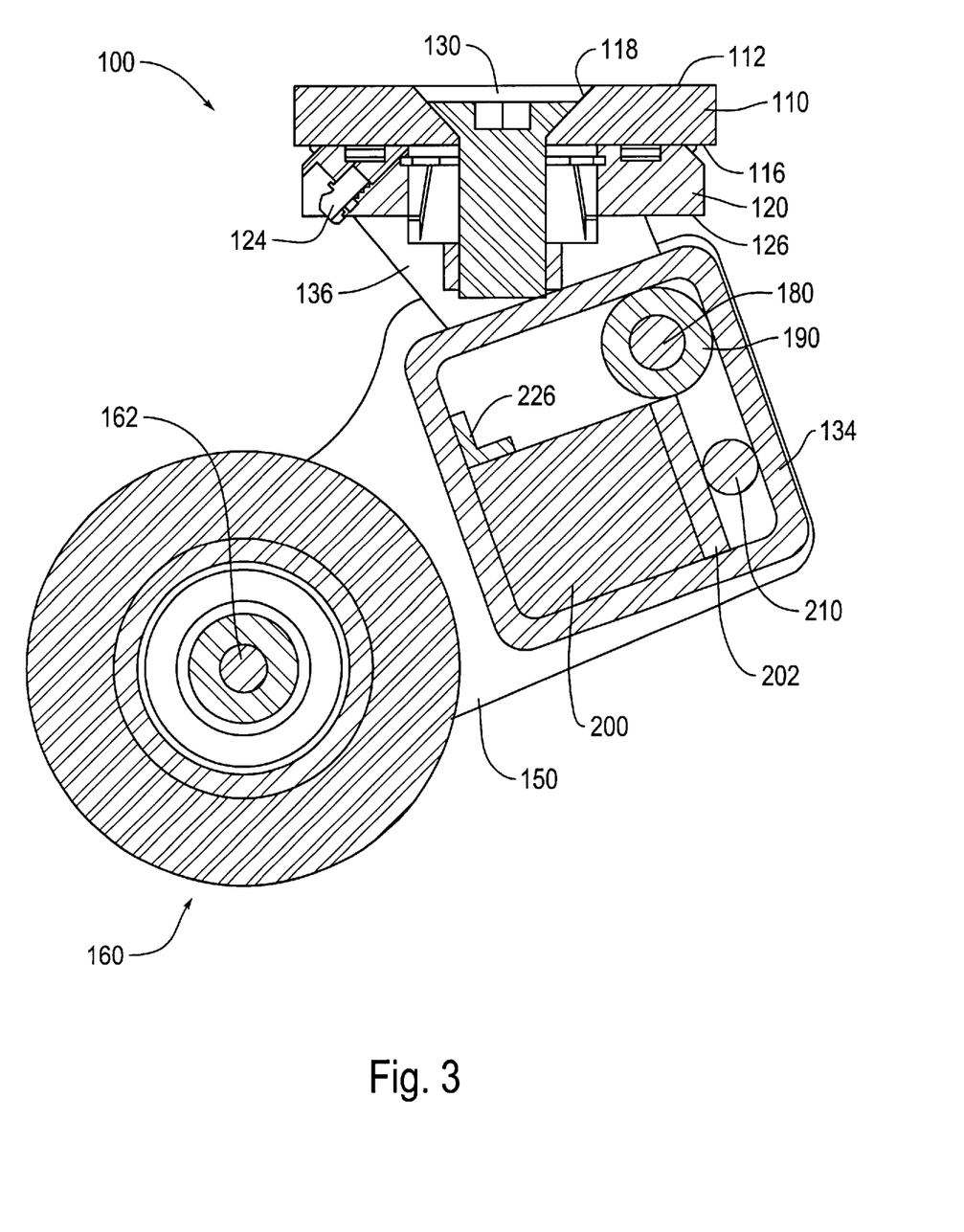
FIG. 3 is a vertical cross sectional view through the caster wheel assembly of FIG. 1.

FIGS. 1–4 illustrate a first exemplary embodiment of an industrial caster wheel assembly 100 according to this invention. As shown in FIGS. 1–4, the industrial caster wheel assembly 100 includes a mounting base 110 having a first surface 112. The mounting base 110 also includes a plurality of holes 114 usable to mount the mounting base 110 to an object. As shown in FIG. 3, the mounting base 110 also includes an second surface 116 to which a housing base 120 is attached. As shown in FIG. 2, the housing base 120 includes a swivel bearing assembly 122.

The mounting base 110 also includes a recess 118 in the first surface 112. A screw 130 extends through the recess 118 of the mounting base 110, the housing base 120, and the swivel bearing assembly 122. As shown in FIG. 2, a nut 132 can be screwed onto the screw 130. The industrial caster wheel assembly 100 thus forms a bearing assembly, having a grease fitting 124, so that the swivel bearing assembly 122 rotates about an axis 300.

Figure 4:
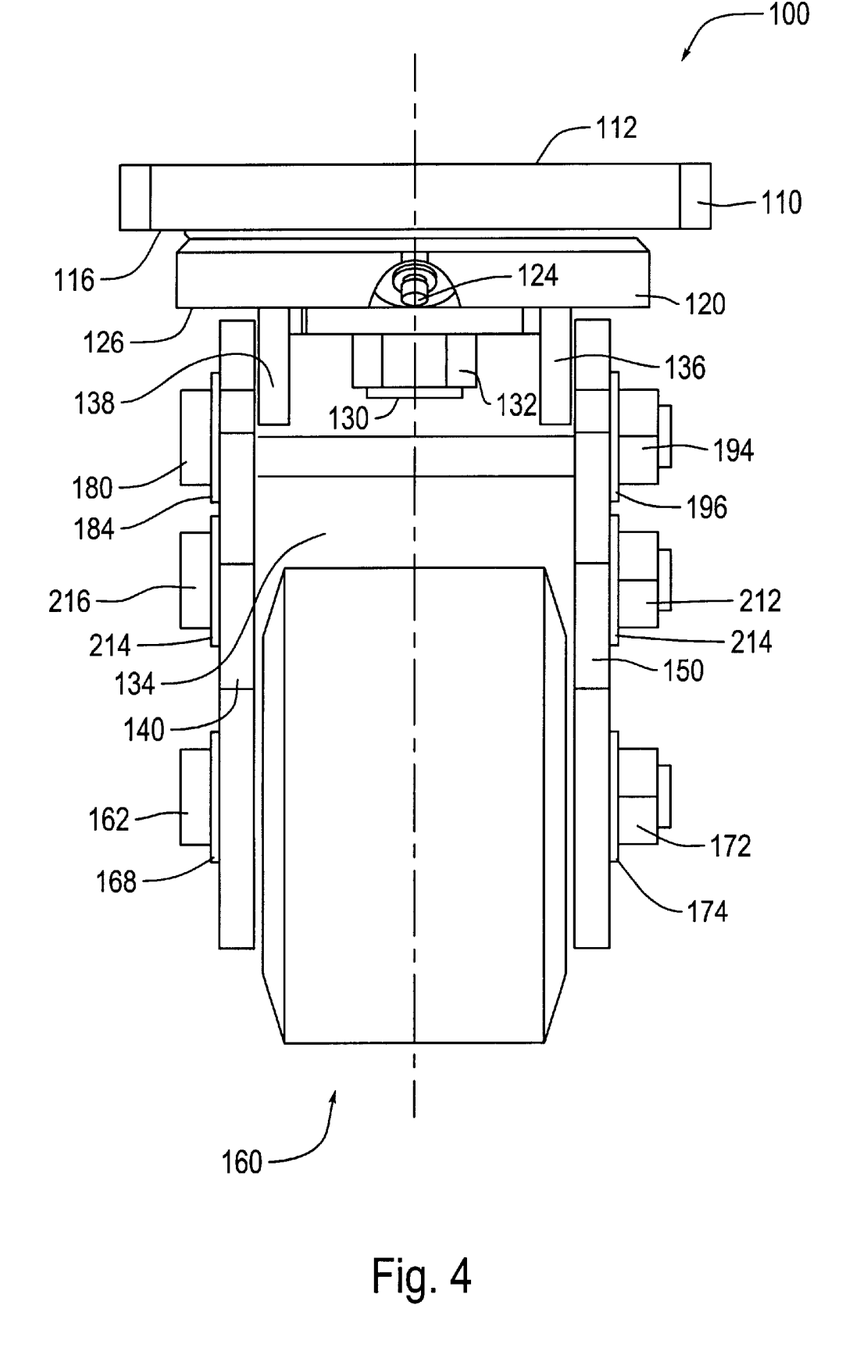
FIG. 4 is a plan view of the caster wheel assembly of FIG. 1.

As shown in FIGS. 2 and 4, the industrial caster wheel assembly 100 also includes a pair of support plates 136 and 138. As shown in FIG. 4, the support plates 136 and 138 are located between side plates 140 and 150, respectively, and are located roughly adjacent to a first side 126 of the housing base 120. Additionally, the nut 132 is located between the support plates 136 and 138, as shown in FIG. 4.

The industrial caster wheel assembly 100 further includes a wheel assembly 160 mounted on a wheel axle 162. As shown in FIG. 2, the side plates 140 and 150 each includes a plurality of holes 164 and 165, respectively. The location of the holes 164 and 165 can be varied to adjust the height of the caster wheel assembly 100. The wheel axle 162 includes a bolt 166 having a washer 168 and a head 170 engaging one of the side plates 140 or 150. The bolt 166 extends through one of the holes 164 or 165 of a first one of the side plates 140 or 150, through the wheel assembly 160, through the opposed hole 165 or 164 of the second one of the side plates 150 or 140. A nut 172 and a washer 174 are screwed onto the bolt 166 and tightened against the outside surface of the second one of the side plates 140 or 150. In various exemplary embodiments, the wheel assembly 160 includes suitable bearings and bushings, as known in the art. The wheel assembly 160 rotates about a wheel axis 302.

The side plates 140 and 150 include a first edge 142 and 152, a first side 146 and 156, a second side 148 and 158 and a second edge 144 and 154, respectively. In various exemplary embodiments, the first edge 142 and 152, the first side 146 and 156, the second side 148 and 158, and the second edge 144 and 154 can be curved. The first edges 142 and 152 can be used to provide a deflection stop when the industrial caster wheel assembly 100 is under full deflection. That is, the first edges 142 and 152 can contact, or align with, the mounting base 110 when the industrial caster wheel assembly 100 is under full deflection. In various exemplary embodiments, in a normal, unstressed, position of the industrial caster wheel assembly 100, the first edges 142 and 152 of the side plates 140 and 150 can be aligned with a housing 134.

The industrial caster wheel assembly 100 also includes a pivot axle 180. As shown in FIG. 3, the pivot axle 180 includes a bolt 182 having a washer 184 and a head 186 that engages a first one of the side plates 140 or 150. The bolt 182 extends through a hole 188 or 192 formed in the first one of the side plates 140 and 150, through the housing 134, through a pivot bushing 190, and through the opposing hole 188 or 192 formed in the second one of the side plates 140 or 150. A nut 194 and a washer 196 are screwed onto the bolt 182 and tightened against the outside surface of the plates 140 or 150. The pivot axle 180 allows the wheel assembly 160 and the side plates 140 and 150 to rotate relative to the housing 134, the second bearing assembly 122, the housing base 120 and the mounting base 110 about a pivot axis 304.

The pivot bushing 190 is attached to the housing 134. In various exemplary embodiments, the pivot bushing 190 is attached to the housing 134 by welding it to the housing 134. However, it should be appreciated that the pivot bushing 190 can be attached by an appropriate known or later developed attachment method. It should also be appreciated that, in various exemplary embodiments, it is not necessary to attach the pivot bushing 190 to the housing 134. In various exemplary embodiments, the pivot bushing 190 is located in a corner of the housing 134 adjacent to an elastomeric support member 200 as shown in FIG. 3. However, it should also be appreciated that the pivot bushing 190 can be located at any appropriate position within the housing 134.

The industrial caster wheel assembly 100 also includes the elastomeric support member 200. In various exemplary embodiments, the elastomeric support member 200 is attached to a plate 202. The combined width w of the elastomeric support member 200 and the plate 202 are less than the interior width W of the housing 134. In FIG. 3, the height h, the width w and the length 1 of the elastomeric support member 200 can each be any appropriate value.

In particular, the values for the dimensions h, w and l of the elastomeric support member 200 and the plate 202 are chosen to achieve a desired deflection or a desired deflection response, as discussed below with respect to FIG. 6. In various exemplary embodiments, the elastomeric support member 200 is of a cylindrical shape with the dimensions of the elastomeric support member 200 and the plate 202 less than the interior width W of the housing 134. However, it should be appreciated that the elastomeric support member 200 can be of any desirable shape or dimension so long as the elastomeric member 200 provides the desired deflection and/or desired deflection response. This desired deflection response is described in greater detail below with respect to FIG. 6.

The industrial caster wheel assembly 100 also includes an adjustable axle 210. As shown in FIG. 3, the adjustable axle 210 includes a bolt 212 having a washer 214 and a head 216 that engages a first one of the side plates 140 or 150. As shown in FIG. 2, the bolt 212 extends through a hole 218 or 220 formed in the first one of the side plates 140 and 150, through the housing 134, through the opposing hole 218 or 220 formed in the second one of the side plates 140 or 150. A nut 212 and a washer 214 are screwed onto the bolt 212 and tightened against the outside surface of the plates 140 or 150. A tab 226 can be placed on the inside of the housing 134. If used, the tab 226 resists movement of the elastomer support member 200.

The elastomeric support member 200 is compressed when the adjustable axle 210 contacts the plate 202. In various exemplary embodiments, the adjustable axle contacts the plate 202 at approximately the midpoint of a first dimension of the elastomeric support member 200. However, it should be appreciated that the adjustable axle 210 can contact the plate 202 at any appropriate location.

In various exemplary embodiments, the side plates 140 and 150 each includes a plurality of holes formed in the side plates 140 and 150. The locations of the holes can be chosen so that the adjustable axle 210 rotates around the pivot axle 180. The locations of the holes can also be chosen so that the adjustable axle 210 compresses the variably shaped elastomeric support member 200.

In operation, the wheel assembly 160 rests against a surface ground and rotates about the wheel axle 302. The wheel assembly 160 and the side plates 140 and 150 deflect by rotating about the pivot axis 304 of the pivot axle 180. The caster wheel assembly 100 can also rotate by rotating about the axis 300.

Suspension is provided as the elastomeric support member 200 allows one of the wheel assembly 160 and the mounting base 110 to rotate about the pivot axle 180 as the adjustable axle 210 compresses the elastomeric support member 200 by contacting the plate 202. The elastomeric support member 200 thus acts as a spring suspension and damper that resists the upward movement by accommodating shock loads due to impact.

Figure 5:
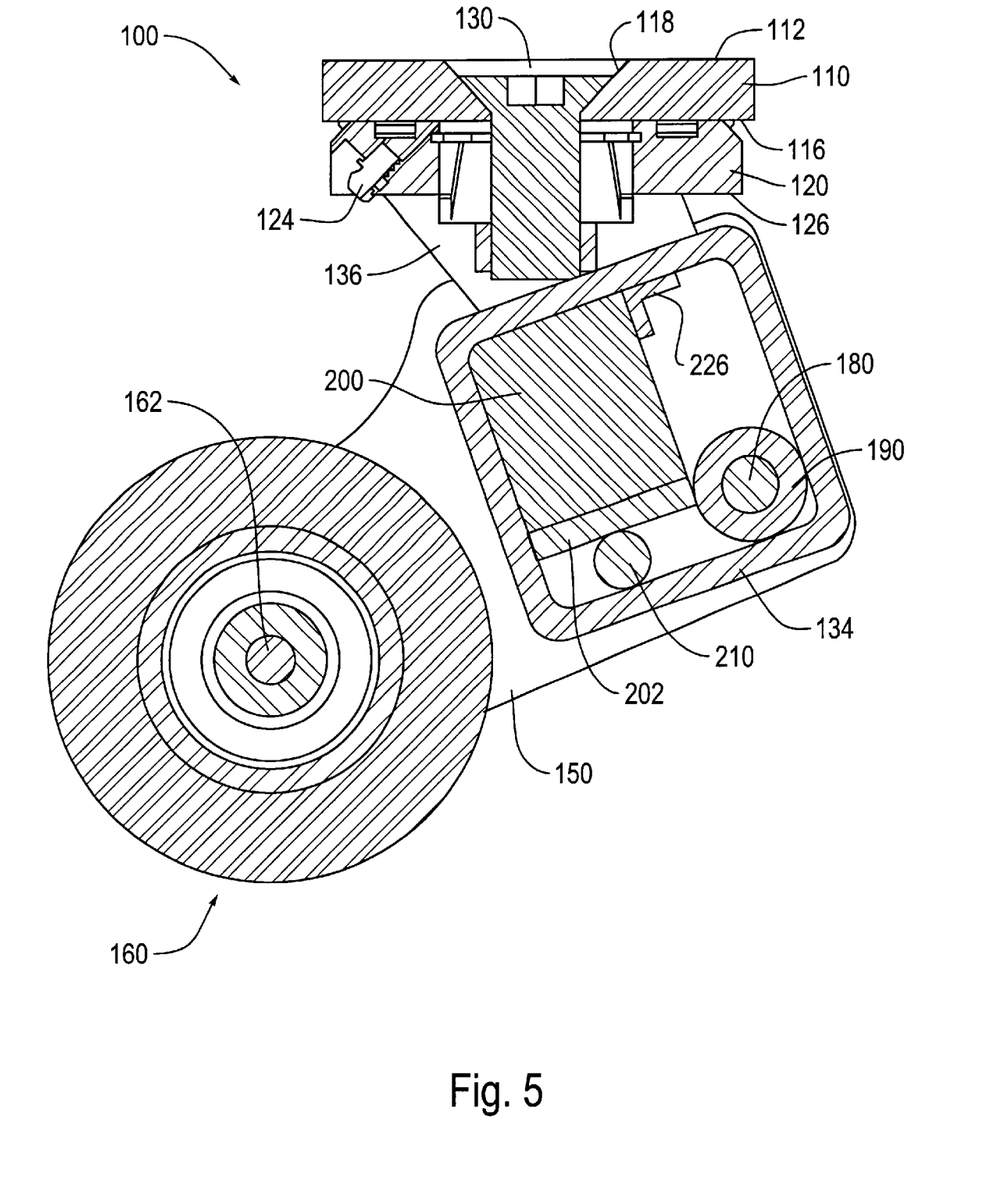
FIG. 5 is a vertical cross sectional view through a second exemplary embodiment of the spring caster wheel assembly according to this invention.

In various exemplary embodiments, as shown for example in FIG. 5, the height h and the width w of the elastomeric support member 200 and the height H and the width W of the housing 134 can be effectively rotated relative to the wheel 160 and the base member 110. However, it should be appreciated that by rotating the elastomeric support member 200 and housing 134, the housing 134 can be narrowed according to the respective dimensions of the height h and the width w of the elastomeric support member 200 and thus allow a smaller turning radius about the pivot axle 304.

Figure 6:
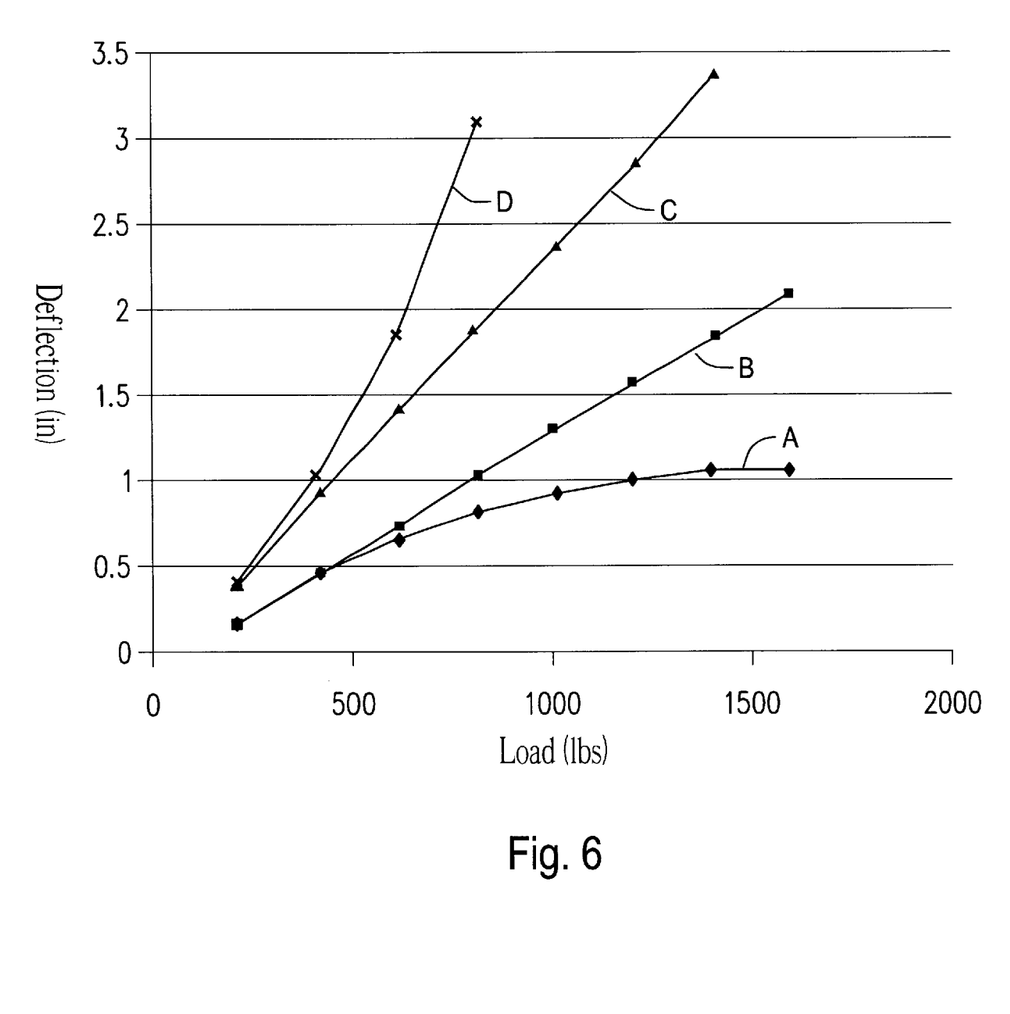
FIG. 6 is a graph plotting exemplary relationships between the load and the deflection provided by the spring caster wheel according to this invention.

FIG. 6 is a graph plotting a number of different deflection to load response curves. In various exemplary embodiments, the desired deflection response can be similar to the curve A shown in the deflection/load graph of FIG. 6 The curve A demonstrates a decreasing deflection rate with an increasing load that causes the industrial caster wheel assembly 100 to reach full deflection. However, it should be appreciated that the industrial caster wheel assembly 100 can reach full deflection under any load in order to accommodate elevation restrictions while avoiding hard mechanical stops or "jarring".

In various exemplary embodiments, the desired deflection response can be similar to curve B shown in the deflection/load graph of FIG. 6. The curve B demonstrates a linear deflection over a large deflection range. However, it should be appreciated that as the elastomeric support member 200 dampens the applied load, the industrial caster wheel assembly 100 remains steady as the elastomeric support member 200 smoothly compresses.

In various exemplary embodiments, the desired deflection response can be similar to the curve C shown in the deflection/load graph of FIG. 6. The curve C is the same as the curve B, except that the elastomeric support member 200 has a lower compression modulus. As a result, for the curve C, the elastomeric support member 200 also offers a larger deflection under similar loads.

In various exemplary embodiments, the desired deflection response can be similar to the curve D shown in the deflection/load graph of FIG. 6. The curve D shows an increasing deflection with an increased load. It should be appreciated that the curve D can be achieved by changing the location of the adjustable axle 210 relative to the elastomeric support member 200, so that the direction of force of the adjustable axle varies as the deflection increases. It should also be appreciated that, in the desired deflection response illustrated by the curve D, the industrial caster wheel assembly 100 offers stiff response for small loads and allows for an increasing deflection rate as the load increases.

In various exemplary embodiments, the elastomeric support member 200 can be formed from an elastomeric material having a hardness of approximately 50 Shore A to approximately 70 Shore D. In various exemplary embodiments, such an elastomeric material can be rubber or polyurethane.

In various exemplary embodiments, the elastomeric material forming the elastomeric member 200 can have a compression modulus of between around 650 psi and 5000 psi. However, it should be appreciated that any combination of one or more elastomeric materials having any combination hardness of that material and compression modulus of that material, where the combination of hardness and compression modulus provides a desired deflection response and/or range, can be used to form the elastomeric support member 200.

In various exemplary embodiments, the elastomeric support member 200 can be designed to have a resilience, as measured by Bayshore Rebound, that is between about 20% and about 80%. However, it should be appreciated that the elastomeric support member 200 is not limited to this resilience range. The rebound for the elastomeric support member 200 can be chosen to provide a desired amount of damping, mechanical resistance, or energy dissipation. In general, low rebound materials provide high damping or high energy dissipation, while high rebound materials provide a low damping or low energy dissipation. Thus, depending on the damping and energy dissipation requirements, one of ordinary skill in the art will readily appreciate how to select an appropriate material for the elastomeric member 200.

In various exemplary embodiments, the height and width of the elastomeric support member 200 can be chosen so that the compressive force applied to the elastomeric support member 200 does not exceed about 30% of the compression modulus of the combination of the one or more materials forming the elastomeric support member 200. However, it should be appreciated that maximum compressive force to be applied to the elastomeric support member 200 is not limited to this range of the compression modulus, so long as the elastomeric support member 200 has a reasonably useful life. In various exemplary embodiments, limiting the maximum compressive force applied to the elastomeric support member in this way reduces the strain on the elastomeric support member 200. This in turn reduces the susceptibility of the elastomeric material forming the elastomeric member 200 to fatigue failure due to the compressive force to be applied to elastomeric support member 200. In various exemplary embodiments, a typical range of the compressive force applied to the elastomeric support member 200 is between about 50 psi to about 900 psi. However, it should be appreciated that the elastomeric support member 200 can be used when the compressive force to be applied to the elastomeric support member 200 extends outside of this range in either direction.

In various exemplary embodiments, the width-to-height ratio of the elastomeric support member 200 can be chosen to ensure that the maximum strain on the elastomeric support member 200 does not substantially exceed a desired maximum strain. The desired maximum strain can be determined by the required deflection of the industrial caster wheel assembly 100. In various exemplary embodiments, the maximum desired strain is between about 5% and about 50%. In this case, the desired width-to-height ratio of the elastomeric support member 100 is between about 0.5 to about 2.0. However, it should be appreciated that neither the maximum or desired strain on, nor the width-to-height ratio of, the elastomeric support member 200 is limited to these ranges.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An industrial caster wheel assembly, comprising:
   a plurality of side plates, each side plate having an inside wall;
   a housing positioned between the inside walls of at least two of the plurality of the side plates;
   a first axle supported by at least two of the plurality of side plates and extending through the housing, the housing rotatable relative to the at least two side plates around the first axle;
   a second axle supported by at least two of the plurality of side plates and extending through the housing; and
   an elastomeric support member positioned in the housing adjacent to the first and second axles;
   wherein when the housing rotates relative to the at least two side plates about the first axle, the second axle compresses the elastomeric support member.

2. The industrial caster wheel assembly of claim 1, further comprising a base member supported by the housing.

3. The industrial caster wheel assembly of claim 2, wherein an edge of the plurality of side plates provide a deflection stop when in contact with the base member.

4. The industrial caster wheel assembly of claim 1, further comprising:
   a wheel arranged at a respective side of at least two of the plurality of side plates; and
   a third axle that supports the wheel, the wheel rotatable around a first axis, the third axle supported by the at least two of the plurality of side plate.

5. The industrial caster wheel assembly of claim 4, further comprising a plurality of holes formed in the at least two of the plurality of side plates usable to adjust a position of the third axle relative to the elastomeric member.

6. The industrial caster wheel assembly of claim 1, further comprising a tab positioned on an inside wall of the housing that restricts movement of the elastomeric support member.

7. The industrial caster wheel assembly of claim 1, further comprising a plurality of holes formed in the at least two of the plurality of side plates usable to adjust a position of the second axle based on a size of the elastomeric support member.

8. The industrial caster wheel assembly of claim 1, wherein each side edge of the plurality of side plates is curved.

9. The industrial caster wheel assembly of claim 1, further comprising a pivot bushing extending between the side plates and surrounding the first axle within the housing.

10. The industrial caster wheel assembly of claim 1, further comprising a rigid plate positioned between the second axle and the elastomeric support member, wherein the second axle compresses the elastomeric support member by contacting the rigid plate.

11. The industrial caster wheel assembly of claim 10, wherein the second axle compresses the elastomeric support member by contacting the rigid plate at approximately the midpoint of a first dimension of the elastomeric support member.

12. The industrial caster wheel assembly of claim 1, wherein the geometry of the elastomeric support member is selected to obtain a desired deflection response.

13. The industrial caster wheel assembly of claim 1, wherein a geometry of the elastomeric support member is selected to achieve a range of pressure from 50 psi to 900 psi.

14. The industrial caster wheel assembly of claim 1, wherein the elastomeric support member has a width-to-height ratio of about 0.5 to about 2.0.

15. The industrial caster wheel assembly of claim 1, wherein at least one of a hardness and a compression modulus of the elastomeric support member is selected to obtain a desired deflection response.

16. The industrial caster wheel assembly of claim 1, wherein the hardness of the elastomeric support member ranges from about 50 Shore A to about 70 Shore D.

17. The industrial caster wheel assembly of claim 1, wherein the compression modulus of the elastomeric support member ranges from about 650 psi to about 5,000 psi.

18. The industrial caster wheel assembly of claim 1, wherein a Bayshore Rebound of the elastomeric support member is about 20% and about 80%.

19. The industrial caster wheel assembly of claim 1, wherein a strain of the elastomeric support member while under compression is between about 5% to about 50%.

* * * * *